United States Patent
Suzuki

(10) Patent No.: US 10,378,683 B2
(45) Date of Patent: Aug. 13, 2019

(54) JOINT STRUCTURE FOR STEEL PIPES AND METHOD OF MANUFACTURING THE SAME

(71) Applicant: METAL ONE CORPORATION, Tokyo (JP)

(72) Inventor: Teruaki Suzuki, Tokyo (JP)

(73) Assignee: METAL ONE CORPORATION, Tokyo (JP)

( * ) Notice: Subject to any disclaimer, the term of this patent is extended or adjusted under 35 U.S.C. 154(b) by 251 days.

(21) Appl. No.: 15/517,647

(22) PCT Filed: Oct. 17, 2014

(86) PCT No.: PCT/JP2014/077685
§ 371 (c)(1),
(2) Date: Apr. 7, 2017

(87) PCT Pub. No.: WO2016/059719
PCT Pub. Date: Apr. 21, 2016

(65) Prior Publication Data
US 2017/0307114 A1    Oct. 26, 2017

(51) Int. Cl.
  *F16L 15/00*  (2006.01)
  *E21B 17/042* (2006.01)
  *F16L 21/00*  (2006.01)

(52) U.S. Cl.
  CPC .......... *F16L 15/001* (2013.01); *E21B 17/042* (2013.01); *E21B 17/0423* (2013.01); *F16L 21/002* (2013.01)

(58) Field of Classification Search
  CPC ..... F16L 15/001; F16L 15/006; F16L 15/009; F16L 15/004; F16L 21/002
  (Continued)

(56) References Cited

U.S. PATENT DOCUMENTS 1,525,414 A * 2/1925 Roeckner .............. F16L 21/002
                                                        285/332
4,373,750 A * 2/1983 Mantelle ............... F16L 15/003
                                                        285/334
(Continued)

FOREIGN PATENT DOCUMENTS

CN      102587845 A     7/2012
EP      2 527 701 A1    11/2012
(Continued)

OTHER PUBLICATIONS

Japanese Office Action dated Jan. 16, 2018 for Application No. JP 2016-553942 with English translation.
(Continued)

*Primary Examiner* — Aaron M Dunwoody
(74) *Attorney, Agent, or Firm* — Ladas & Parry LLP

(57) ABSTRACT

A joint structure for steel pipes according to the invention includes a pair of steel pipes having male threads formed at end portions thereof, and a coupling having a pair of sets of female threads formed therein so that the male threads of the pair of steel pipes screw in the pair of the sets of female threads, respectively. Distal end surfaces at the end portions of the steel pipes have inner circumferential edges each protruding in a direction of a pipe axis with respect to outer circumferential edges thereof. When the pair of steel pipes are coupled to each other by the coupling and the inner circumferential edges of the distal end surfaces of the pair of steel pipes are brought into contact with each other, a gap is formed between the outer circumferential edges of the distal end surfaces of the pair of steel pipes.

7 Claims, 5 Drawing Sheets

(58) Field of Classification Search
USPC .................. 285/66, 9.2, 333, 390, 332.4
See application file for complete search history.

(56) References Cited

U.S. PATENT DOCUMENTS

| | | | | |
|---|---|---|---|---|
| 4,616,537 A * | 10/1986 | Axford | ................ | E21B 17/042 |
| | | | | 470/176 |
| 4,673,201 A * | 6/1987 | Dearden | ............... | F16L 15/004 |
| | | | | 285/333 |
| 4,762,344 A * | 8/1988 | Perkins | .................. | E21B 17/08 |
| | | | | 285/148.19 |
| 5,769,466 A * | 6/1998 | Noel | ..................... | E21B 17/042 |
| | | | | 285/332 |
| 5,782,503 A * | 7/1998 | Noel | ..................... | F16L 15/001 |
| | | | | 285/334 |
| 5,906,399 A * | 5/1999 | Noel | ..................... | E21B 17/042 |
| | | | | 285/333 |
| 6,817,633 B2 * | 11/2004 | Brill | ...................... | F16L 15/001 |
| | | | | 285/148.19 |
| 7,387,319 B2 * | 6/2008 | Papousek | ................ | E04C 5/165 |
| | | | | 285/333 |
| 2006/0152000 A1 * | 7/2006 | DeLange | ............. | E21B 17/042 |
| | | | | 285/334 |
| 2006/0273586 A1 * | 12/2006 | Reynolds, Jr. | ........ | F16L 15/004 |
| | | | | 285/390 |
| 2008/0252074 A1 * | 10/2008 | Ohngren | ............... | B23K 9/046 |
| | | | | 285/333 |
| 2012/0032435 A1 * | 2/2012 | Carcagno | ............ | E21B 17/0423 |
| | | | | 285/96 |
| 2012/0074692 A1 * | 3/2012 | Chelette | ................ | F16L 15/001 |
| | | | | 285/333 |
| 2012/0235404 A1 * | 9/2012 | Coeffe | .................. | E21B 17/043 |
| | | | | 285/332 |
| 2018/0051835 A1 * | 2/2018 | Lane | ....................... | E21B 17/08 |

FOREIGN PATENT DOCUMENTS

| | | |
|---|---|---|
| JP | 52-133115 A | 11/1977 |
| JP | 57-122884 U | 7/1982 |
| JP | 59-195988 A | 11/1984 |
| JP | 2003-221808 A | 8/2003 |
| JP | 2004-76843 A | 3/2004 |

OTHER PUBLICATIONS

International Search Report (ISR) and Written Opinion (WO) dated Jan. 13, 2015 for International Application No. PCT/JP2014/077685, with English translation of ISR.
Australian Office Action dated Nov. 3, 2015 for Australian Application No. 2015100966.
Espacenet English abstract of JP 2003-221808 A.
Espacenet English abstract of JP 2004-76843 A.
Espacenet English abstract of JP 52-133115 A.
Espacenet English abstract of CN 102587845 A.
Canadian Office Action dated Apr. 25, 2018 mailed in connection with corresponding Canadian Application No. 2,963,456.

* cited by examiner

Model "SA+0.5" to "SA+4"
Shoulder angle = positive θ

Model " SA0 "
Shoulder angle = 0 degree

Model " SA-0.5 " to "SA-4"
Shoulder angle = negative θ degree

KPO-2023

JOINT STRUCTURE FOR STEEL PIPES AND METHOD OF MANUFACTURING THE SAME

RELATED APPLICATION

This application is an application under 35 U.S.C. 371 of International Application No. PCT/JP2014/077685 filed on Oct. 17, 2014, the entire contents of which are incorporated herein by reference.

TECHNICAL FIELD

The present invention relates to a joint structure for steel pipes and a method of manufacturing the joint structure for steel pipes. In particular, the present invention relates to a joint structure for steel pipes, which is constructed of steel pipes such as oil country tubular goods each having male threads formed on an outer circumference of an end portion thereof, and a joint having female threads formed on an inner circumference thereof, and to a method of manufacturing the joint structure for steel pipes.

BACKGROUND ART

Hitherto, oil country tubular goods (steel pipes to be used at oil wells) are connected to each other by a joint. A coupling that constructs the joint has formed therein female threads (sometimes referred to as "box threads") gradually expanded from both ends to a center of the coupling, whereas the steel pipe (hereinafter sometimes referred to as "pin") has male threads (sometimes referred to as "pin threads") formed at an end portion of the steel pipe to screw in the female threads.

The structure in which the female threads and the male threads are screwed in each other to connect the pair of steel pipes to each other by the joint is hereinafter referred to as "joint structure".

Further, the joint structure is required to have gas-tightness and anti-looseness. From the viewpoint of enhancing the gas-tightness and the anti-looseness, there is disclosed a threaded joint for steel pipes, in which the shapes of the female threads and the male threads are limited (see, for example, Patent Literature 1).

CITATION LIST

Patent Literature

Patent Literature 1: Japanese Unexamined Patent Application Publication No. 2002-22069 (Page 2 to Page 5, FIG. 3)

SUMMARY OF INVENTION

Technical Problem

In the threaded joint for steel pipes as disclosed in Patent Literature 1, an inner diameter and a taper value of the female threads and an outer diameter and a taper value of the male threads are set to fall within respective ranges defined by predetermined inequalities. That is, the taper value of the male threads is set larger than the taper value of the female threads, and the taper value of the male threads is set smaller than ½ of a maximum side of a tolerance thereof, whereas the taper value of the female threads is set smaller than ½ of a minimum side of a tolerance thereof. As a result, there is a problem in that an apparatus (threading machine) capable of manufacturing the threaded joint for steel pipes is limited and the cost is increased.

Further, the distal end surfaces of the steel pipes (end surfaces at the end portions having the male threads processed therein) are brought into contact with each other, but each of the distal end surfaces is processed perpendicular to a steel shaft, and may therefore be inclined with respect to a pipe axis depending on process capability of processing means. As a result, the actual area of contact is limited to the area of a part of the distal end surfaces, and hence the contact part is plastically deformed, thereby causing a problem in that high tightening torque cannot be obtained.

Note that, when the pressure of a production layer is low at the oil well, a pump is hitherto mounted to a suction steel pipe (hereinafter referred to as "tubing pipe") to suck petroleum (crude oil) up to the ground. In recent years, there has been employed a mechanism constructed such that a long rod is arranged through the tubing pipe and rotated by a motor installed on the ground, to thereby actuate a helical pump mounted at a lower end of the rod (Progressive Cavity Pump: PCP). In this case, the rod causes significant vibrations, and the joint (threads) coupling the tubing pipes to each other is loosened or sometimes disengaged due to the vibrations even when the shape of the protruding portion falls within a range of a tolerance thereof. As a result, the tubing pipe may drop into the oil well. It is therefore important to solve the problem in that high tightening torque cannot be obtained.

The present invention has been made to solve the problem described above, and has an object to provide a joint structure for steel pipes and a method of manufacturing the joint structure for steel pipes, which are capable of obtaining high tightening torque through contact between distal end surfaces of the steel pipes within a wide range even without using a special apparatus (threading machine).

Solution to Problem (1) According to one embodiment of the present invention, there is provided a joint structure for steel pipes, including: a pair of steel pipes having male threads formed at end portions thereof; and a coupling having a pair of sets of female threads formed therein so that the male threads of the pair of steel pipes screw in the pair of the sets of female threads, respectively, in which distal end surfaces at the end portions of the pair of steel pipes have inner circumferential edges each protruding in a direction of a pipe axis with respect to outer circumferential edges of the distal end surfaces at the end portions of the pair of steel pipes, and in which, when the pair of steel pipes are coupled to each other by the coupling, the inner circumferential edges of the distal end surfaces of the pair of steel pipes are brought into contact with each other prior to contact between the outer circumferential edges of the distal end surfaces of the pair of steel pipes.

(2) Further, an opening angle formed by the distal end surfaces with respect to a plane perpendicular to the pipe axis of each of the pair of steel pipes is less than or equal to 2 degrees.

(3) Further, an inner circumferential opening angle formed by distal end surfaces with respect to a plane perpendicular to the pipe axis of each of the pair of steel pipes within a range from the inner circumferential edge to an intermediate position between the inner circumferential edge and the outer circumferential edge is less than or equal to 4 degrees, whereas an outer circumferential opening angle formed by the distal end surfaces with respect to the plane perpendicular to the pipe axis of each of the pair of steel pipes within a range from the intermediate position to the outer circumferential edge is less than or equal to 2 degrees. In addition, the inner circumferential opening angle is larger than the outer circumferential opening angle, and a difference between the inner circumferential opening angle and the outer circumferential opening angle is less than or equal to 2 degrees.

(4) Besides, according to one embodiment of the present invention, there is provided a method of manufacturing the joint structure for steel pipes of item (2), the method including:

using processing means having a process capability ($\Delta\theta$) of less than or equal to $\pm 0.4$ degrees for forming each of the distal end surfaces of the pair of steel pipes with respect to a plane perpendicular to the pipe axis; and setting a processing target angle ($\theta a$) of each of the distal end surfaces with respect to the plane perpendicular to the pipe axis so that an angle ($\theta a \pm \Delta\theta$) of each of the processed distal end surfaces with respect to the plane perpendicular to the pipe axis is more than 0.0 degrees and is less than or equal to 1.0 degree.

(5) Besides, according to one embodiment of the present invention, there is provided a method of manufacturing the joint structure for steel pipes of item (3), the method including:

using processing means having a process capability ($\Delta\theta$) of less than or equal to $\pm 0.2$ degrees for forming each of the distal end surfaces of the pair of steel pipes with respect to a plane perpendicular to the pipe axis;

setting a processing target angle ($\theta b$) of each of the distal end surfaces with respect to the plane perpendicular to the pipe axis within the range from the inner circumferential edge to the intermediate position with respect to the plane perpendicular to the pipe axis so that an angle ($\theta b \pm \Delta\theta$) of each of the processed distal end surfaces with respect to the plane perpendicular to the pipe axis within the range from the inner circumferential edge to the intermediate position with respect to the plane perpendicular to the pipe axis is more than 1.0 degree and is less than or equal to 2.0 degrees; and setting a processing target angle ($\theta a$) of each of the distal end surfaces with respect to the plane perpendicular to the pipe axis within the range from the intermediate position to the outer circumferential edge with respect to the plane perpendicular to the pipe axis so that an angle ($\theta a \pm \Delta\theta$) of each of the processed distal end surfaces with respect to the plane perpendicular to the pipe axis within the range from the intermediate position to the outer circumferential edge with respect to the plane perpendicular to the pipe axis is more than 0.0 degrees and is less than or equal to 1.0 degree.

(6) Further, a difference ($\theta a - \theta b + 2\Delta\theta$) between the angle ($\theta b \pm \Delta\theta$) of each of the processed distal end surfaces with respect to the plane perpendicular to the pipe axis within the range from the inner circumferential edge to the intermediate position and the angle ($\theta a \pm \Delta\theta$) of each of the processed distal end surfaces with respect to the plane perpendicular to the pipe axis within the range from the intermediate position to the outer circumferential edge is less than or equal to 1.0 degree.

Advantageous Effects of Invention (i) In the joint structure for steel pipes according to the one embodiment of the present invention, when the pair of steel pipes are coupled to each other by the coupling, regions of the distal end surfaces on the inner circumferential side are first brought into contact with each other so that the contact surfaces are expanded toward the outer circumferential side of the distal end surfaces. Therefore, the area of contact is increased as compared to a case where regions of the distal end surfaces on the outer circumferential side are first brought into contact with each other so that the contact surfaces are expanded toward the inner circumferential side.

(ii) Further, the distal end surfaces are single-tapered surfaces having the opening angle of less than or equal to 2 degrees therebetween, and hence the contact between the distal end surfaces is gradually expanded from the inner circumferential side to the outer circumferential side as the tightening is progressed. As a result, high tightening torque can be obtained while suppressing steep increase in tightening torque.

(iii) Further, the distal end surfaces are double-tapered surfaces having the inner circumferential opening angle larger than the outer circumferential opening angle, and hence regions within a wide range from the inner circumferential edges to the outer circumferential edges of the distal end surfaces are stably brought into contact with each other even when the tightening torque is low. Still further, when the difference between the opening angles at positions corresponding to inflection points of the tapers of the distal end surfaces as the double-tapered surfaces is set to less than or equal to 2.0, decrease in contact pressure can be prevented at those positions (details thereof are described separately).

(iv) Besides, in the method of manufacturing a joint structure for steel pipes according to the one embodiment of the present invention, the processing target angle ($\theta a$) of each of the distal end surfaces of the steel pipes with respect to the plane perpendicular to the pipe axis is set in consideration of the process capability ($\Delta\theta$) for forming each of the distal end surfaces with respect to the plane perpendicular to the pipe axis, and hence the angle ($\theta a \pm \Delta\theta$) of each of the processed distal end surfaces with respect to the plane perpendicular to the pipe axis is more than 0.0 degrees and is less than or equal to 1.0 degree (corresponding to the opening angle of less than or equal to 2 degrees). As a result, a joint structure for steel pipes capable of achieving the effects of items (i) and (ii) can be obtained.

(v) Besides, the processing target angle ($\theta b$) of each of the distal end surfaces of the steel pipes with respect to the plane perpendicular to the pipe axis within the range from the inner circumferential edges to the intermediate positions and the processing target angle ($\theta c$) of each of the distal end surfaces with respect to the plane perpendicular to the pipe axis within the range from the intermediate positions to the outer circumferential edges are set in consideration of the process capability ($\Delta\theta$) for forming each of the distal end surfaces with respect to the plane perpendicular to the pipe axis, and hence the angle ($\theta b \pm \Delta\theta$) of each of the processed distal end surfaces with respect to the plane perpendicular to the pipe axis within the range from the inner circumferential edges to the intermediate positions is more than 1.0 degree and is less than or equal to 2.0 degrees (corresponding to the inner circumferential opening angle of less than or equal to 4 degrees), whereas the angle ($\theta c \pm \Delta\theta$) of each of the processed distal end surfaces with respect to the plane perpendicular to the pipe axis within the range from the intermediate positions to the outer circumferential edges is more than 0.0 degrees and is less than or equal to 1.0 degree (corresponding to the outer circumferential opening angle of less than or equal to 2 degrees). As a result, a joint structure for steel pipes capable of achieving the effects of items (i) and (iii) can be obtained.

(vi) Besides, the difference ($\theta c - \theta b + 2\Delta\theta$) between the angle ($\theta b \pm \Delta\theta$) of each of the processed distal end surfaces with respect to the plane perpendicular to the pipe axis within the range from the inner circumferential edges to the intermediate positions and the angle ($\theta c \pm \Delta \theta$) of each of the processed distal end surfaces with respect to the plane perpendicular to the pipe axis within the range from the intermediate positions to the outer circumferential edges is less than or equal to 1.0 degree. As a result, a joint structure for steel pipes capable of securely achieving the effects of item (iii) can be obtained.

DESCRIPTION OF EMBODIMENTS

Embodiment 1

Figure 1:
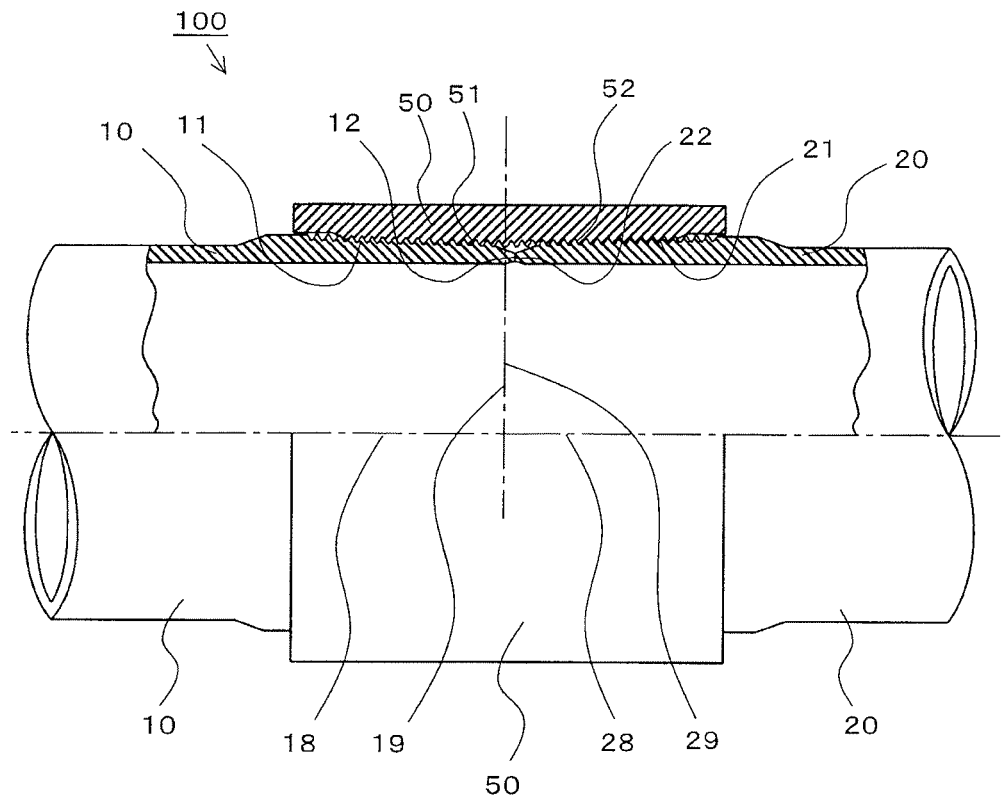
FIG. 1 is an illustration of a joint structure for steel pipes according to Embodiment 1 of the present invention, in which an upper half is a side sectional view of a part of the joint structure for steel pipes, whereas a lower half is a side view of a part of the joint structure for steel pipes.
Figure 2:
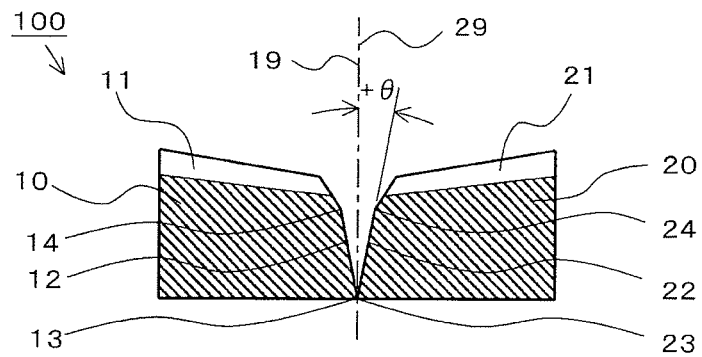
FIG. 2 is a partially-enlarged side sectional view illustrating the joint structure for steel pipes illustrated in FIG. 1.
Figure 3:
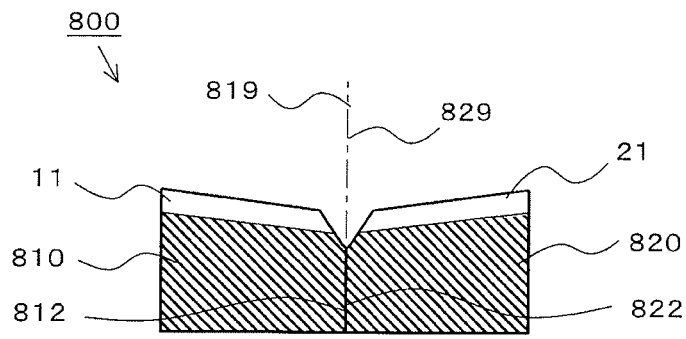
FIG. 3A is a partially-enlarged side sectional view of a comparative member, for illustrating the joint structure for steel pipes illustrated in FIG. 1.
FIG. 3B is a partially-enlarged side sectional view of a comparative member, for illustrating the joint structure for steel pipes illustrated in FIG. 1.
Figure 3:
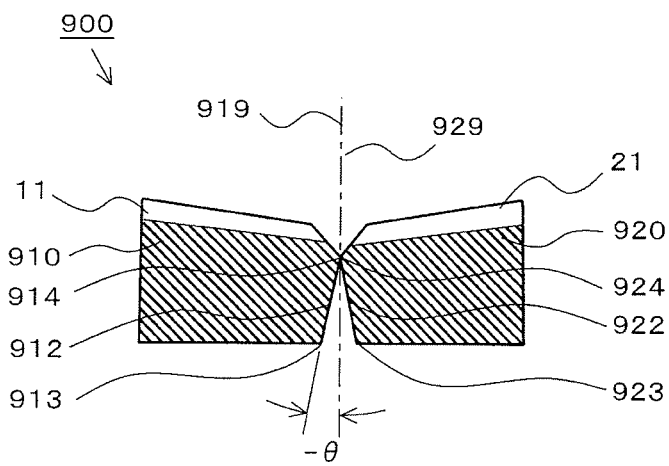

FIG. 1 to FIG. 3B are illustrations of a joint structure for steel pipes according to Embodiment 1 of the present invention. An upper half of FIG. 1 is a side sectional view of a part of the joint structure for steel pipes, whereas a lower half of FIG. 1 is a side view of a part of the joint structure for steel pipes. FIG. 2 is a partially-enlarged side sectional view of the joint structure for steel pipes. FIG. 3A and FIG. 3B are partially-enlarged side sectional views of comparative members. Note that, respective portions are schematically illustrated, and the present invention is not limited to the forms thus illustrated.

In FIG. 1, a joint structure 100 for steel pipes (hereinafter referred to as "joint structure") includes a first steel pipe 10 and a second steel pipe 20 connected to each other by a coupling 50. In this case, the coupling 50 is connected to the first steel pipe 10 at a factory (corresponding to "mill") in advance, whereas the second steel pipe 20 is connected to the coupling 50 at an oil producing site (corresponding to "field"). Note that, the first steel pipe 10 and the second steel pipe 20 have the same shape, but the modifier "first" or "second" is affixed to the name of each part for convenience of the description.

One end portion of the first steel pipe 10 (right end portion in FIG. 1) is formed to be thick toward an outer circumferential side thereof (externally upset), and first male threads 11 are formed on an outer circumference of the end portion.

Similarly, another end portion of the second steel pipe 20 (left end portion in FIG. 1) is formed to be thick toward an outer circumferential side thereof (externally upset), and second male threads 21 are formed on an outer circumference of the end portion.

Further, the first male threads 11 screw in first female threads 51 formed in the coupling 50, whereas the second male threads 21 screw in second female threads 52 formed in the coupling 50. A distal end surface at the one end portion of the first steel pipe 10 (hereinafter referred to as "first distal end surface 12") and a distal end surface at the other end portion of the second steel pipe 20 (hereinafter referred to as "second distal end surface 22") are brought into contact with each other.

(Shoulder Angle)

In FIG. 2, the first distal end surface 12 has a tapered shape in cross section, in which an inner circumferential edge 13 protrudes in a direction of a pipe axis 18 (see FIG. 1) with respect to an outer circumferential edge 14. Similarly, the second distal end surface 22 has a tapered shape in cross section, in which an inner circumferential edge 23 protrudes in a direction of a pipe axis 28 (see FIG. 1) with respect to an outer circumferential edge 24.

Therefore, when the inner circumferential edge 13 of the first distal end surface 12 and the inner circumferential edge 23 of the second distal end surface 22 are brought into contact with each other, the first distal end surface 12 and the second distal end surface 22 form a gap having a V-shape in cross section, which is expanded toward the outer circumferential side.

In this case, an angle formed by the first distal end surface 12 with respect to a pipe-axis perpendicular plane 19 perpendicular to the pipe axis 18 of the first steel pipe 10 and an angle formed by the second distal end surface 22 with respect to a pipe-axis perpendicular plane 29 perpendicular to the pipe axis 28 of the second steel pipe 20 (hereinafter referred to as "shoulder angles $\theta$") are "positive angles".

Note that, as tightening is progressed, the range of contact between the first distal end surface 12 and the second distal end surface 22 is broadened toward the outer circumferential side.

(Comparative Member)

In FIG. 3A, a joint structure 800 for steel pipes (hereinafter referred to as "joint structure") as a comparative member is used for confirming actions and effects of the joint structure 100 for steel pipes. A first distal end surface 812 of a first steel pipe 810 is parallel to a pipe-axis perpendicular plane 819 perpendicular to a pipe axis (not shown), whereas a second distal end surface 822 of a second steel pipe 820 is parallel to a pipe-axis perpendicular plane 829 perpendicular to a pipe axis (not shown). The first distal end surface 812 and the second distal end surface 822 are entirely brought into contact with each other.

In FIG. 3B, a joint structure 900 for steel pipes (hereinafter referred to as "joint structure") as a comparative member is used for confirming the actions and effects of the joint structure 100 for steel pipes. In a first distal end surface 912 of a first steel pipe 910, an outer circumferential edge 914 protrudes in a direction of a pipe axis with respect to an inner circumferential edge 913, whereas in a second distal end surface 922 of a second steel pipe 920, an outer circumferential edge 924 protrudes in a direction of a pipe axis with respect to an inner circumferential edge 923. That is, the outer circumferential edge 914 of the first distal end surface 912 and the outer circumferential edge 924 of the second distal end surface 922 are brought into contact with each other, and a gap is formed between the inner circumferential edge 913 and the inner circumferential edge 923.

In this case, an angle formed by the first distal end surface 912 with respect to a pipe-axis perpendicular plane 919 perpendicular to the pipe axis (not shown) of the first steel pipe 910 and an angle formed by the second distal end surface 922 with respect to a pipe-axis perpendicular plane 929 perpendicular to the pipe axis (not shown) of the second steel pipe 920 (hereinafter referred to as "shoulder angles $-\theta$") are "negative angles".

(Calculation of Contact Pressure Distribution)

Figure 4:
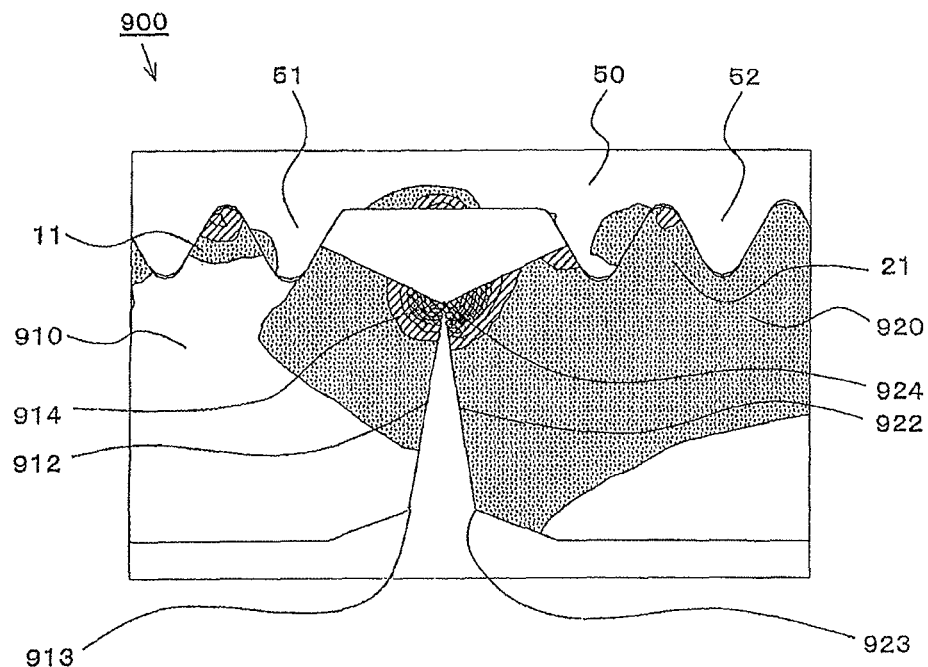
FIG. 4 is a side sectional view of a contact pressure distribution when distal end surfaces of the joint structure for steel pipes as the comparative member illustrated in FIG. 3B are brought into contact with each other.

FIG. 4 is a side sectional view of a contact pressure distribution when the first distal end surface 912 and the second distal end surface 922 of the joint structure 900 for steel pipes as the comparative member illustrated in FIG. 3B are brought into contact with each other. In FIG. 4, the outer circumferential edges 914 and 924 of the joint structure 900 are brought into contact with each other, and hence a stress concentrates at the contact position between the outer circumferential edge 914 and the outer circumferential edge 924. As the position is spaced away from the rigid contact position, the contact stress is gradually decreased. In FIG. 4, a range of the highest stress is indicated by cross hatching, a range of the second highest stress is indicated by simple hatching, and a range of a lower stress than the second highest stress is indicated by a matte pattern.

Figure 5:
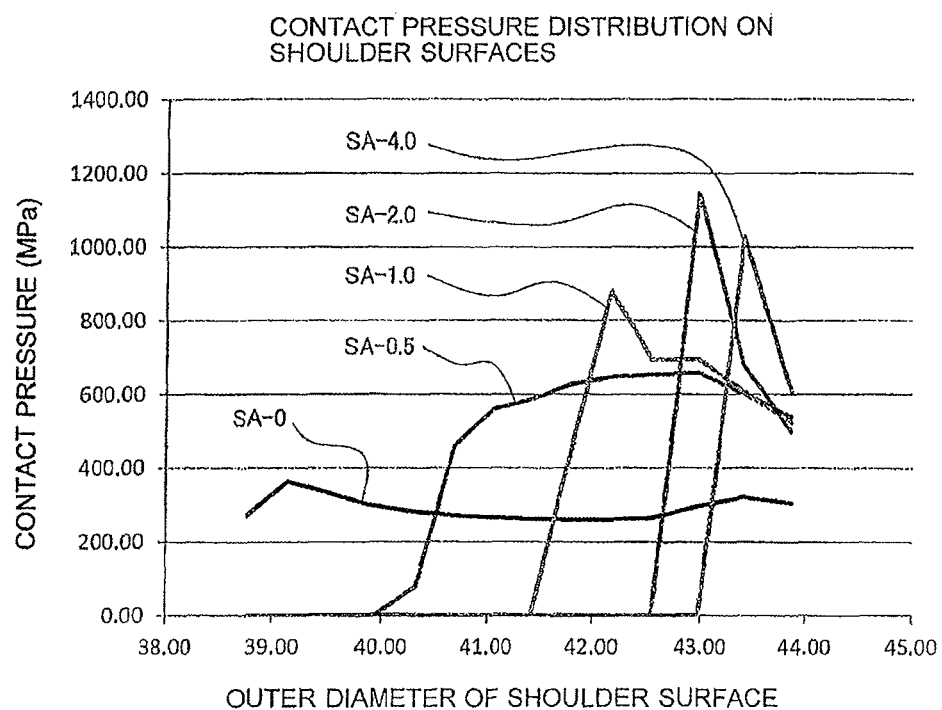
FIG. 5 is a contact pressure distribution graph showing contact pressure distributions when the distal end surfaces of the joint structures for steel pipes as the comparative members illustrated in FIG. 3A and FIG. 3B are brought into contact with each other.

FIG. 5 is a contact pressure distribution graph showing contact pressure distributions when the first distal end surface 812 and the second distal end surface 822 of the joint structure 800 for steel pipes as the comparative member illustrated in FIG. 3A are brought into contact with each other, and when the first distal end surface 912 and the second distal end surface 922 of the joint structure 900 as the comparative member illustrated in FIG. 3B are brought into contact with each other. The vertical axis represents a contact pressure per unit area, and the horizontal axis represents a distance from the pipe axis (distance in a thickness direction). That is, a distance of 38.76 mm on the horizontal axis corresponds to a distance at each of the inner circumferential edges 913 and 923, and a distance of 43.87 mm corresponds to a distance at each of the outer circumferential edges 914 and 924. In this case, tightening torque is 3,500 ft-lbs.

(Contact Pressure Distribution of Comparative Member)

In FIG. 5, the joint structure 800 (SA0) has a shoulder angle $\theta$ of "0 degrees", and regions within a range from the inner circumferential edges 913 and 923 to the outer circumferential edges 914 and 924 are entirely brought into contact with each other, thereby exhibiting a substantially constant contact pressure distribution of about 300 MPa.

In FIG. 5, the joint structure 900 has a negative shoulder angle, and hence, even when the shoulder angle $\theta$ has any value, the outer circumferential edges 914 and 924 start to be brought into contact with each other. As the negative value of the shoulder angle $-\theta$ is increased, the contact range is narrowed.

That is, in a case of "SA-0.5" where the shoulder angle $-\theta$ is "−0.5 degrees", the contact range is from about 40 mm to about 44 mm, and a contact pressure distribution having a value of about 650 MPa in a range close to the outer circumference is generated. In a case of "SA-1.0" where the shoulder angle $-\theta$ is "−1.0 degree", on the other hand, the contact range is from about 41.5 mm to about 44 mm, and a mountain-shaped contact pressure distribution having a peak value of about 900 MPa at a point of about 42 mm is generated.

Further, in a case of "SA-2.0" where the shoulder angle $-\theta$ is "−2.0", the contact range is from about 42.5 mm to about 44 mm, and a mountain-shaped contact pressure distribution having a peak value of about 1,150 MPa at a point of about 43 mm is generated. Still further, in a case of "SA-4.0" where the shoulder angle $-\theta$ is "−4.0", the contact range is a significantly narrow range from 43 mm to about 44 mm, and a mountain-shaped contact pressure distribution having a peak value of about 1,000 MPa at a point of about 43.5 mm is generated.

(Contact Pressure Distribution of Embodiment 1)

Figure 6:
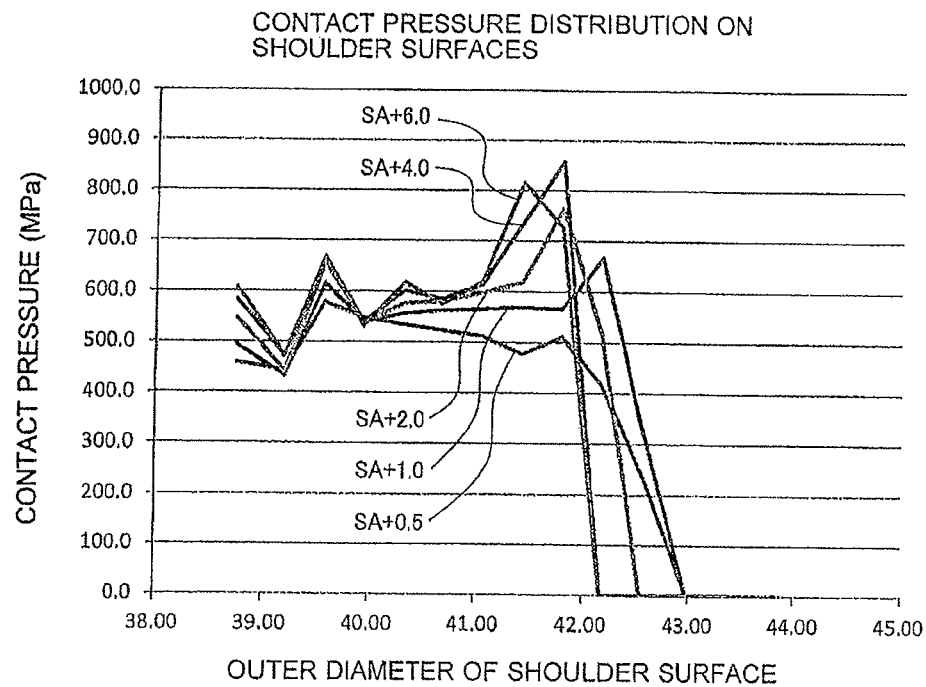
FIG. 6 is a contact pressure distribution graph showing contact pressure distributions in the joint structure for steel pipes illustrated in FIG. 1.

FIG. 6 is a contact pressure distribution graph showing contact pressure distributions in the joint structure 100 for steel pipes illustrated in FIG. 1. In FIG. 6, the joint structure 100 has a positive "shoulder angle $\theta$". The cases where the shoulder angles $\theta$ are "+0.5 degrees", "+1.0 degree", "+2 degrees", "+4 degrees", and "+6.0" are referred to as "SA+0.5", "SA+1.0", "SA+2.0", "SA+4.0", and "SA+6.0", respectively.

In FIG. 6, in the case of "SA+0.5" where the shoulder angle $\theta$ is "+0.5 degrees", regions within a wide range from the inner circumferential edge 813 (about 38.8 mm) to the outer circumferential edge 814 (about 43 mm) are brought into contact with each other, and a contact pressure distribution gradually and slightly decreased from about 550 MPa to about 500 MPa within a range from about 39.5 mm to about 42 mm is generated.

Further, in the case of "SA+1.0" where the shoulder angle $\theta$ is "+1.0 degree", regions within a wide range are brought into contact with each other similarly to the case of SA+0.5. A contact pressure distribution having a substantially constant value of about 550 MPa within a range from about 40.0 mm to about 42 mm is generated, and a mountain-shaped contact pressure distribution having a peak value of about 600 MPa at a point on the inner circumferential side of the above-mentioned range and a peak value of about 650 MPa at a point on the outer circumferential side of the above-mentioned range is also generated.

Besides, in the case of "SA+2.0" where the shoulder angle $\theta$ is "+2.0 degrees", a contact pressure distribution having a contact pressure increased toward a radially outer side within a range near a center of the thickness (from about 40.0 mm to about 41.5 mm) is generated, and a mountain-shaped contact pressure distribution having a peak value of about 750 mm on an outer circumferential side of the above-mentioned range is also generated.

Further, this tendency is more remarkable in the cases of "SA+4.0" and "SA+6.0" where the shoulder angles $\theta$ are "+4.0 degrees" and "+6.0", respectively.

(Actions and Effects of Shoulder Angle)

From the above description, the following facts are confirmed.

(a) When the shoulder angle $\theta$ is negative, the area of contact is decreased and a stress concentrates at a positon close to the outer circumferential edges 14 and 24. As a result, a uniform contact pressure distribution cannot be obtained.

(b) When the shoulder angle $\theta$ is positive, on the other hand, the contact between the distal end surfaces is gradually expanded from the inner circumferential side to the outer circumferential side as the tightening is progressed. As a result, high tightening torque can be obtained while suppressing steep increase in tightening torque.

(c) In this case, when the shoulder angle θ is set to less than or equal to "+1.0 degree", a relatively uniform contact pressure distribution can be obtained.

(Manufacturing Method of Embodiment 1)

As described above, the joint structure 100 has a shoulder angle θ (positive angle) of preferably "less than or equal to 1.0 degree", and needs to avoid an angle of "less than 0.0 degrees (negative angle)". Therefore, when manufacturing the joint structure 100, the capability of processing the first distal end surface 12 of the first steel pipe 10 (the same applies to the second distal end surface 22 of the second steel pipe 20), that is, the angle of inclination of the processed surface with respect to the plane perpendicular to the pipe axis (hereinafter referred to as "process capability (Δθ)") is considered.

That is, with use of processing means having a process capability of less than or equal to (Δθ), a processing target angle (θa) of the first distal end surface 12 with respect to the plane perpendicular to the pipe axis 18 (of the second distal end surface 22 with respect to the plane perpendicular to the pipe axis 28) is set so that an angle (θa±Δθ) of the processed first distal end surface 12 is more than 0.0 degrees and is less than or equal to 1.0 degree.

For example, when the process capability (Δθ) is ±0.4 degrees, the processing target angle (θa) is set to "0.5 degrees". Further, when the process capability (Δθ) is ±0.3 degrees, the processing target angle (θa) is set to a value within a range of "from 0.4 degrees to 0.6 degrees". Still further, when the process capability (Δθ) is ±0.2 degrees, the processing target angle (θa) is set to a value within a range of "from 0.3 degrees to 0.7 degrees".

Thus, according to this manufacturing method, the processing target (θa) is set in accordance with the process capability (Δθ) of the processing apparatus to be used irrespective of the magnitude of the process capability (Δθ), and hence the first distal end surface 12 (second distal end surface 22) having a positive shoulder angle θ can be obtained.

Embodiment 2

Figure 7:
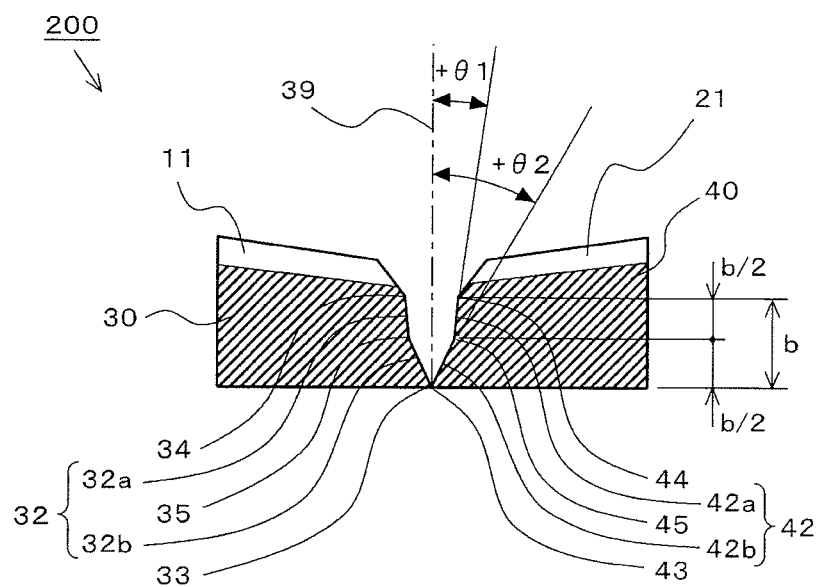
FIG. 7 is a partially-enlarged side sectional view illustrating a joint structure for steel pipes according to Embodiment 2 of the present invention.

FIG. 7 is a partially-enlarged side sectional view illustrating a joint structure for steel pipes according to Embodiment 2 of the present invention. Note that, parts identical or corresponding to those of Embodiment 1 are represented by the same reference symbols, and a part of the description is therefore omitted herein.

In FIG. 7, a joint structure 200 for steel pipes (hereinafter referred to as "joint structure") includes a third steel pipe 30 and a fourth steel pipe 40 connected to each other by the coupling 50 (not shown: see FIG. 1). In this case, the coupling 50 is connected to the third steel pipe 30 at a factory (corresponding to "mill") in advance, whereas the fourth steel pipe 40 is connected to the coupling 50 at an oil producing site (corresponding to "field"). Note that, the third steel pipe 30 and the fourth steel pipe 40 have the same shape, but the modifier "third" or "fourth" is affixed to the name of each part for convenience of the description.

The first male threads 11 are formed on an outer circumference of one end portion of the third steel pipe 30 (right end portion in FIG. 7). Similarly, the second male threads 21 are formed on an outer circumference of another end portion of the fourth steel pipe 40 (left end portion in FIG. 7).

Further, the first male threads 11 screw in the first female threads 51 formed in the coupling 50, whereas the second male threads 21 screw in the second female threads 52 formed in the coupling 50. A distal end surface at the one end portion of the third steel pipe 30 (hereinafter referred to as "third distal end surface 32") and a distal end surface at the other end portion of the fourth steel pipe 400 (hereinafter referred to as "fourth distal end surface 42") are brought into contact with each other.

(Shoulder Angle)

In FIG. 7, the third distal end surface 32 is a double-tapered surface in a plane including a pipe axis, and is therefore bent at an intermediate position 35 between an inner circumferential edge 33 and an outer circumferential edge 34. That is, a third outer tapered surface 32a having an "outer shoulder angle θ1 (positive angle)" and being inclined with respect to a pipe-axis perpendicular plane 39 is formed between the intermediate position 35 and the outer circumferential edge 34, whereas a third inner tapered surface 32b having an "inner shoulder angle θ2 (positive angle)" and being inclined with respect to the pipe-axis perpendicular plane 39 perpendicular to the pipe axis (not shown) of the third steel pipe 30 is formed between the inner circumferential edge 33 and the intermediate position 35.

Similarly, in the fourth distal end surface 42 of the fourth steel pipe 40, a fourth outer tapered surface 42a having the "outer shoulder angle θ1 (positive angle)" is formed between an intermediate position 45 and an outer circumferential edge 44, whereas a fourth inner tapered surface 42b having the "inner shoulder angle θ2 (positive angle)" is formed between an inner circumferential edge 43 and the intermediate position 45.

In this case, the inner shoulder angle θ2 is larger than the outer shoulder angle θ1 (θ2>θ1>0.0 degrees).

(Contact Pressure Distribution of Embodiment 2)

Figure 8:
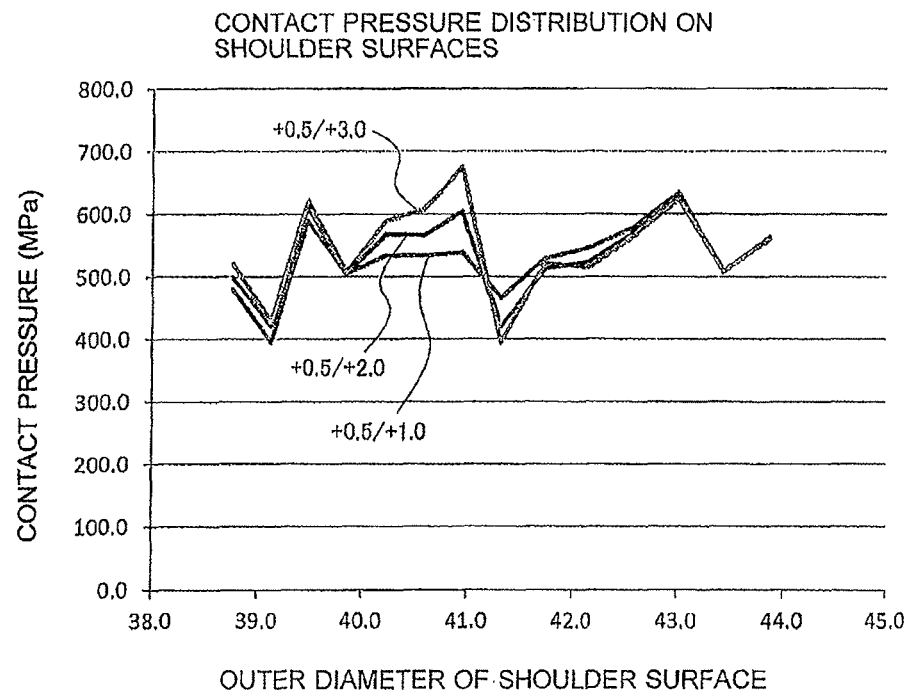
FIG. 8 is a contact pressure distribution graph showing contact pressure distributions in the joint structure for steel pipes illustrated in FIG. 7.
Figure 9:
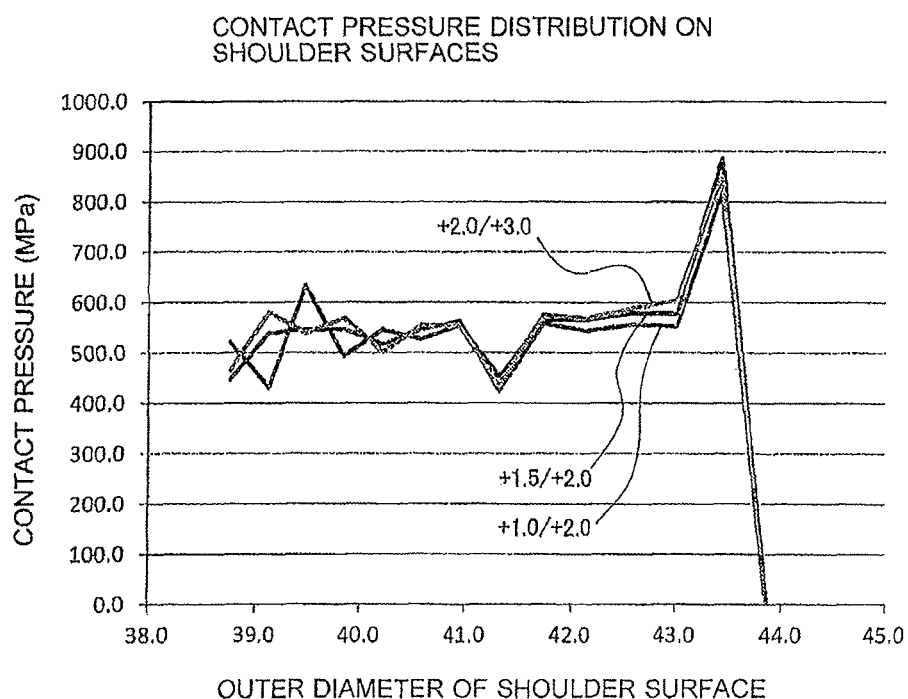
FIG. 9 is a contact pressure distribution graph showing contact pressure distributions in the joint structure for steel pipes illustrated in FIG. 7.

FIG. 8 and FIG. 9 are contact pressure distribution graphs showing contact pressure distributions in the joint structure 200 for steel pipes illustrated in FIG. 7.

In FIG. 8, the "outer shoulder angle θ1 (positive angle)" is set to "+0.5 degrees", whereas the "inner shoulder angle θ2 (positive angle)" is set to "+1.0 degree", "+2.0 degrees", or "+3.0 degrees". Those cases are referred to as "SA+0.5/+1.0", "SA+0.5/+2.0", and "SA+0.5/+3.0", respectively.

In the case of SA+0.5/+1.0, the contact pressure distribution is a substantially constant contact pressure distribution of about more than or equal to 500 MPa within a range from the inner circumferential edges 33 and 43 to the intermediate positions 35 and 45. The contact pressure is slightly decreased at the intermediate positions 35 and 45, and is gradually increased to exceed about 600 MPa within a range from the intermediate positions 35 and 45 to the outer circumferential edges 34 and 44.

In the case of SA+0.5/+2.0, the contact pressure is gradually increased to reach about more than or equal to 500 MPa within the range from the inner circumferential edges 33 and 43 to the intermediate positions 35 and 45, and is decreased to about 350 MPa at the intermediate positions 35 and 45. Then, the contact pressure is gradually increased again to exceed about 600 MPa within the range from the intermediate positions 35 and 45 to the outer circumferential edges 34 and 44.

In the case of SA+0.5/+3.0, on the other hand, the contact pressure is steeply increased to reach a point close to about 700 MPa within the range from the inner circumferential edges 33 and 43 to the intermediate positions 35 and 45, and is steeply decreased to about 150 MPa at the intermediate positions 35 and 45. Then, the contact pressure is increased to exceed about 600 MPa within the range from the intermediate positions 35 and 45 to the outer circumferential edges 34 and 44.

In FIG. 9, the case where the "outer shoulder angle θ1 (positive angle)" and the "inner shoulder angle θ2 (positive angle)" are set to "+1.0 degree" and "+2.0 degrees", respectively, is referred to as "SA+1.0/+2.0 degrees", the case where the "outer shoulder angle θ1 (positive angle)" and the "inner shoulder angle θ2 (positive angle)" are set to "+1.5 degrees" and "+2.0 degrees", respectively, is referred to as "SA+1.5/+2.0 degrees", and the case where the "outer shoulder angle θ1 (positive angle)" and the "inner shoulder angle θ2 (positive angle)" are set to "+2.0 degrees" and "+3.0 degrees", respectively, is referred to as "SA+2.0/+3.0 degrees". In each of the cases of SA+1.0/+2.0 degrees, SA+1.5/+2.0 degrees, and SA+2.0/+3.0 degrees where the inner shoulder angle θ2 is more than or equal to +2.0, the contact pressure is steeply increased to exhibit a peak at a point close to the outer circumferential edges 14 and 24, but the contact pressure is not decreased in the vicinity of the intermediate positions 15 and 25.

(Actions and Effects of Double-Tapered Surface)

From the above description, the following actions and effects are confirmed on the double tapers that are formed on the distal end surface.

(a) Regions within a wide range are brought into contact with each other, and a high contact pressure of about more than or equal to 500 MPa can be obtained within a substantially entire range. That is, in the case of the single-tapered surface shown in FIG. 6, the contact pressure is steeply decreased on an outer circumference located farther than a point at a distance of about 42 mm from the axial center. In the case of the single-tapered surface shown in FIG. 8, on the other hand, the contact pressure is generated within a wide range to the outer circumferential edges 34 and 44 located at a distance of about 44 mm from the axial center.

(b) The outer shoulder angle θ1 is set as small as less than or equal to "+1.0 degree", whereas the inner shoulder angle θ2 is set to "more than +1.0 degree and less than or equal to +2.0 degrees". That is, when the inner shoulder angle θ2 is set to more than +2.0 degrees, the peak of the contact pressure is exhibited on the outer circumferential side.

(c) A difference between the outer shoulder angle θ1 and the inner shoulder angle θ2 is also preferably as small as less than or equal to "+1.0 degree". That is, in the cases of SA+0.5/+2.0 and SA+0.5/+3.0 where the difference is more than 1.0 degree, the contact pressure is decreased at the intermediate positions 15 and 25.

(Manufacturing Method of Embodiment 2)

As described above, the joint structure 200 has an outer shoulder angle θ1 (positive angle) of preferably "less than or equal to 1.0 degree", and needs to avoid an angle of "less than or equal to 0.0 (negative angle)". Further, the joint structure 200 has an inner shoulder angle θ2 (positive angle) of preferably "more than 1.0 degree and less than or equal to 2.0 degrees", and the difference between the outer shoulder angle θ1 and the inner shoulder angle θ2 is also preferably as small as less than or equal to "+1.0 degree".

Therefore, when manufacturing the joint structure 200, the capability of processing the third distal end surface 32 of the third steel pipe 30 (the same applies to the fourth distal end surface 42 of the fourth steel pipe 40), that is, the angle of inclination of the processed surface with respect to the pipe-axis perpendicular plane 39 or 49 (hereinafter referred to as "process capability ($\Delta\theta$)") is considered.

That is, with use of processing means having a process capability ($\Delta\theta$) of less than or equal to $\pm\Delta\theta$ degrees, a processing target angle (θb) of the third outer tapered surface 32a of the third distal end surface 32 with respect to the pipe-axis perpendicular plane 19 is set so that an angle (θa±Δθ) of the processed third outer tapered surface 32a (range from the intermediate position 15 to the outer circumferential edge 14) with respect to the pipe-axis perpendicular plane 19 is more than 0.0 degrees and is less than or equal to 1.0 degree.

Further, a processing target angle (θb) of the third inner tapered surface 32b with respect to the pipe-axis perpendicular plane 19 is set so that an angle (θc±Δθ) of the processed third inner tapered surface 32b (range from the inner circumferential edge 13 of the third distal end surface 32 to the intermediate position 15 thereof) with respect to the pipe-axis perpendicular plane 19 is more than 1.0 degree and is less than or equal to 2.0 degrees.

For example, when the process capability ($\Delta\theta$) is ±0.2 degrees, the processing target angle (θa) is temporarily set to "from 0.3 degrees to 0.7 degrees", whereas the processing target angle (θb) is temporarily set to "from 1.3 degrees to 1.7 degrees".

Further, the difference between the outer shoulder angle θ1 and the inner shoulder angle θ2 is also preferably as small as less than or equal to "+1.0 degree", and hence a difference between the outer shoulder angle "θa±Δθ" after the processing and the inner shoulder angle "θb±Δθ" after the processing is set to less than or equal to 1 degree.

Then, "θb−θa+2Δθ≤1.0", that is, "θb−θa≤1.0−2Δθ" is established. Therefore, when the process capability ($\Delta\theta$) is, for example, ±0.2 degrees, "θb−Γa≤0.6" is established. Consequently, as long as the processing target angles (θa) and (θb) are set to "0.7 degrees" and "1.3 degrees", respectively, "0.5≤(θb±Δθ)≤0.9" and "1.1≤(θc±Δθ)≤1.5" are established after the processing, and hence the angle (θb) and the angle (θc) satisfy such conditions that the angle (θb) and the angle (θc) are "less than or equal to 1.0" and "more than or equal to 1.0", respectively, and "a difference therebetween is less than or equal to 1.0".

When the process capability ($\Delta\theta$) is, for example, ±0.3 degrees, on the other hand, "θb−θa≤0.4" is established. When the processing target angle (θa) is set to "0.6 degrees", the target angle (θa) is "1.0 degree". Thus, "0.3≤(θa±Δθ) ≤0.9" and "0.7≤(θb±Δθ)≤1.3" are established after the processing, and hence the angle (θb) does not satisfy the condition of "more than 1.0".

Thus, according to this manufacturing method, the processing targets (θa) and (θb) are set in accordance with the process capability ($\Delta\theta$) of the processing apparatus to be used irrespective of the magnitude of the process capability ($\Delta\theta$), and hence the double-tapered surface that satisfies the above-mentioned conditions can be obtained.

Industrial Applicability

According to the present invention, it is possible to obtain high tightening torque through the contact between the distal end surfaces of the steel pipes within a wide range without using a special apparatus (threading machine). Thus, the joint structure can widely be used as joint structures for various thread shapes (including buttress threads) of steel pipes each having various shapes (outer diameter, thickness, and material).

REFERENCE SIGNS LIST

10 first steel pipe 11 first male thread 12 first distal end surface 13 inner circumferential edge 14 outer circumferential edge 15 intermediate position 18 pipe axis 19 pipe-axis perpendicular plane
20 second steel pipe 21 second male thread 22 second distal end surface 23 inner circumferential edge 24 outer circumferential edge 28 pipe axis 29 pipe-axis perpendicular plane 30 third steel pipe 32 third distal end surface 32a third outer tapered surface 32b third inner tapered surface 33 inner circumferential edge 34 outer circumferential edge
35 intermediate position 39 pipe-axis perpendicular plane 40 fourth steel pipe 42 fourth distal end surface 42a fourth outer tapered surface 42b fourth inner tapered surface 43 inner circumferential edge
44 outer circumferential edge 45 intermediate position 50 coupling
51 first female thread 52 second female thread 92 distal end surface 100 joint structure (Embodiment 1) 200 joint structure (Embodiment 2) 400 fourth steel pipe 800 joint structure (comparative member) 810 first steel pipe 812 first distal end surface 813 inner circumferential edge 814 outer circumferential edge 819 pipe-axis perpendicular plane 820 second steel pipe 822 second distal end surface
829 pipe-axis perpendicular plane 900 joint structure (comparative member)

The invention claimed is:

1. A joint structure for steel pipes, comprising:
a pair of steel pipes having male threads formed at end portions thereof; and
a coupling having a pair of sets of female threads formed therein so that the male threads of the pair of steel pipes screw in the pair of the sets of female threads, respectively,
wherein distal end surfaces at the end portions of the pair of steel pipes have inner circumferential edges each protruding in a direction of a pipe axis with respect to outer circumferential edges of the distal end surfaces at the end portions of the pair of steel pipes, and
wherein, when the pair of steel pipes are coupled to each other by the coupling, the inner circumferential edges of the distal end surfaces of the pair of steel pipes are brought into contact with each other prior to contact between the outer circumferential edges of the distal end surfaces of the pair of steel pipes,
wherein each of the distal end surfaces at the end portions of the pair of steel pipes includes (a) an inner tapered surface formed within a range from the inner circumferential edge to an intermediate position between the inner circumferential edge and the outer circumferential edge, and (b) an outer tapered surface formed within a range from the intermediate position to the outer circumferential edge, and
wherein, when the pair of steel pipes are coupled to each other by the coupling, an inner circumferential opening angle that is an opening angle of the inner tapered surface with respect to a plane perpendicular to the pipe axis of each of the pair of steel pipes is larger than an outer circumferential opening angle that is an opening angle of the outer tapered surface with respect to the plane perpendicular to the pipe axis of each of the pair of steel pipes.

2. The joint structure for steel pipes of claim 1, wherein a difference between the inner circumferential angle and the outer circumferential angle is less than or equal to 2 degrees.

3. The joint structure for steel pipes of claim 1,
wherein the inner circumferential opening angle is less than or equal to 4 degrees, and
wherein the outer circumferential opening angle is less than or equal to 2 degrees,
wherein the inner circumferential opening angle is larger than the outer circumferential opening angle.

4. A method of manufacturing the joint structure for steel pipes of claim 2, the method comprising:
using processing means having a process capability ($\Delta\theta$) of less than or equal to ±0.4 degrees for forming each of the distal end surfaces of the pair of steel pipes with respect to a plane perpendicular to the pipe axis; and
setting a processing target angle ($\theta a$) of each of the distal end surfaces with respect to the plane perpendicular to the pipe axis so that an angle ($\theta a \pm \Delta\theta$) of each of the processed distal end surfaces with respect to the plane perpendicular to the pipe axis is more than 0.0 degrees and is less than or equal to 1.0 degree.

5. A method of manufacturing the joint structure for steel pipes of claim 3, the method comprising:
using processing means having a process capability ($\Delta\theta$) of less than or equal to ±0.2 degrees for forming each of the distal end surfaces of the pair of steel pipes with respect to a plane perpendicular to the pipe axis;
setting a processing target angle ($\theta b$) of each of the distal end surfaces with respect to the plane perpendicular to the pipe axis within the range from the inner circumferential edge to the intermediate position with respect to the plane perpendicular to the pipe axis so that an angle ($\theta b \pm \Delta\theta$) of each of the processed distal end surfaces with respect to the plane perpendicular to the pipe axis within the range from the inner circumferential edge to the intermediate position with respect to the plane perpendicular to the pipe axis is more than 1.0 degree and is less than or equal to 2.0 degrees; and
setting a processing target angle ($\theta a$) of each of the distal end surfaces with respect to the plane perpendicular to the pipe axis within the range from the intermediate position to the outer circumferential edge with respect to the plane perpendicular to the pipe axis so that an angle ($\theta a \pm \Delta\theta$) of each of the processed distal end surfaces with respect to the plane perpendicular to the pipe axis within the range from the intermediate position to the outer circumferential edge with respect to the plane perpendicular to the pipe axis is more than 0.0 degrees and is less than or equal to 1.0 degree.

6. The method of manufacturing the joint structure for steel pipes of claim 5, wherein a difference ($\theta a - \theta b + 2\Delta\theta$) between the angle ($\theta b \pm \Delta\theta$) of each of the processed distal end surfaces with respect to the plane perpendicular to the pipe axis within the range from the inner circumferential edge to the intermediate position and the angle ($\theta a \pm \Delta\theta$) of each of the processed distal end surfaces with respect to the plane perpendicular to the pipe axis within the range from the intermediate position to the outer circumferential edge is less than or equal to 1.0 degree.

7. The joint structure for steel pipes of claim 1, wherein each of the pair of steel pipes consists of a single layer.

* * * * *